MAGNETIC ALLOYS

Filed Dec. 27, 1971 3 Sheets-Sheet 1

United States Patent Office 3,806,336

Patented Apr. 23, 1974

3,806,336

MAGNETIC ALLOYS

Hideo Kaneko, 2–35–7 Wakabayashi Setagayaku, and Kiyoshi Inoue, 3–16–8 Kamiyoga, Setagayaku, both of Tokyo, Japan Filed Dec. 27, 1971, Ser. No. 212,420
Int. Cl. C22c *39/16;* H01f *1/00*
U.S. Cl. 75—122 12 Claims

ABSTRACT OF THE DISCLOSURE

A magnetic composition of matter containing 0 to 12% by weight silicon and the balance being an alloy which consists essentially of 15 to 35% by weight cobalt, 25 to 40% by weight chromium, 0 to 20% by weight molybdenum, 0 to 20% by weight tungsten and the balance being iron.

This application is related to pending application Ser. No. 138,081 filed April 28, 1971 (now U.S. Pat. No. 3,689,254).

(1) FIELD OF THE INVENTION

This invention relates to a magnetic-material system and, more particularly, to a novel magnetic multicomponent composition of matter or alloy and to the preparation of magnetic bodies composed thereof.

(2) OBJECT OF THE INVENTION

It is an object of this invention to provide an improved alloy system which has excellent magnetic properties, especially high "magnetic hardness," i.e. retentivity or coercive force and magnetic energy product BXH, and yet is of low material cost and of good workability and requires only a relatively simple manufacturing procedure.

This invention makes use of the fact that a certain binary metallic system has, in its composition diagram, a "limit of metastability" or "spinodal" which is thermodynamically defined as the locus of disappearance of the second derivative of the Helmholtz free energy with respect to composition of the system. When a high-temperature composition, which is of homogeneous single-phase structure, of the alloy is brought within the spinodal in a lower temperature range, it is transformed into a separated two-phase structure, the phase separation being called "spinodal decomposition." The decomposed alloy has a periodic microstructure generally in the order of hunderds of angstroms and which consists of composition modulated two isomorphous phases in which one phase is in the form of a fine precipitate uniformly distributed in another phase which forms the matrix. It is observed that if the first phase in such a microstructure is magnetic and the second is nonmagnetic, there results a single-domain structure whereby a highly retentive magnetic body can be obtained.

Investigations from the above standpoint of spinodal decomposition systems and extensive experimentation along this line have now revealed that our iron/chromium alloy, when it includes cobalt and also contains molybdenum and/or tungsten in the proportions set forth below, represents an improved magnetic-material system whose magnetic retentivity and magnetic energy product are comparable with and even higher than those of "Alnico" (iron/aluminum/nickel/cobalt) alloys which have hitherto been a mainstay in the magnetic industry. In addition to their excellent magnetic properties, the improved alloys have, because of their constituent metals, the advantages of lower material cost and better workability than the conventional alloys. The comparative cost advantage is attributable primarily to absence of nickel in the improved alloys. It may also be pointed out that the new compositions advantageously are free from aluminum or titanium and this makes the alloys readily castable. It has also been found that addition of silicon up to a certain proportion moderates heat-treatment conditions required to accomplish the spinodal decomposition of the improved base alloys without materially decreasing the desirable magnetic properties attainable therewith.

There is thus provided, according to this invention, an improved magnetic-material system which essentially consists of 0 to 12% by weight silicon and a magnetic component constituting the balance or 100 to 88% by weight. This magnetic component essentially consists of 25 to 40% by weight chromium, 15 to 35% by weight cobalt, 0 to 20% by weight molybdenum, and 0 to 20% by weight tungsten, the balance being iron; a minimum of 5% by weight iron is preferred although the iron content may range as low as 1% by weight. Thus, the present invention includes by weight:

the ternary Fe/Cr/Co alloy wherein chromium ranges, from 25 to 40%, cobalt ranges from 15 to 35% and iron forms the balance of the essential magnetic component;

the quaternary Fe/Cr/Co/Mo alloy wherein chromium ranges from 25 to 40%, cobalt ranges from 15 to 35%, molybdenum ranges up to 20% and iron forms the balance of the essential components;

the quaternary Fe/Cr/Co/W alloy wherein chromium ranges from 25 to 40%, cobalt ranges from 15 to 35%, tungsten ranges up to 20% and iron forms the balance of the essential magnetic component; and the quinary Fe/Cr/Co/Mo/W alloy wherein chromium ranges from 25 to 40%, cobalt ranges from 15 to 35%, molybdenum ranges up to 20%, tungsten ranges up to 20% and iron forms the balance of the essential magnetic component. The invention also includes quaternary Fe/Cr/Co/Si compositions, quinary Fe/Cr/Co/Mo/Si and Fe/Cr/Co/W/Si compositions, and sexinary Fe/Cr/Co/Mo/W/Si compositions in which silicon is incorporated in amounts up to 12%, with the balance being the compositions listed immediately above.

In the individual alloys, preferably, cobalt ranges from 15 to 30%, molybdenum ranges from 1 to 5% and tungsten ranges from 5 to 15% or 2 to 7% all by weight. Thus, preferably (by weight), the ternary Fe/Cr/Co alloy contains 25 to 40% chromium, 15 to 30% cobalt and the balance iron; the quaternary Fe/Cr/Co/Mo contains 25 to 40% chromium, 15 to 30% cobalt, up to 5% or from 1 to 5% molybdenum and the balance iron; the quaternary Fe/Cr/Co/W alloy contains 25 to 40% chromium, 15 to 30% cobalt, up to 20% or from 1 to 20% or, more preferably, 5 to 15% tungsten and the balance iron; the quinary Fe/Cr/Co/Mo/W alloy contains 25 to 40% chromium, 15 to 30% cobalt, up to or 5% molybdenum, up to 15 or 20% or from 1 to 15 or 20% or, more preferably, 2 to 7% tungsten, and the balance iron. When silicon is to be incorporated, its lower limit should be 0.2%, preferably 1%.

It should be understood that percentage herein is intended to refer to weight percent and the designation "by weight" may be omitted hereinafter. It should also be understood that each of the above defined compositions can include a certain amount of impurities which may unavoidably be introduced and which do not materially affect the magnetic properties of the resulting product.

The method of treating the improved magnetic compositions according to the present invention comprises the procedures required to effect the spinodal decomposition. To this end, while a gradual cooling may be employed to pass the alloy from the high-temperature phase through the miscibility gap area, the following steps have been found highly suitable. The initial step comprises the solution treatment which includes heating at a temperature of 1200 to 1400° C. for a period of 10 minutes to 3 hours and subsequent quenching to bring the homogenized high-temperature phase to room temperature. The quenched body is then tempered or aged at a temperature between 550 and 650° C., preferably between 570 and 620° C. for a period between 1 and 9 hours. The aging is carried out preferably stepwise: the first step of heating at a temperature of 530 to 650° C., preferably between 580 and 630° C. for a period of 30 minutes to 4 hours and the second step of heating at a temperature of 530 to 630° C., preferably between 570 and 600° C., for a period of 30 minutes to 5 hours. Preferably, the solution-treated or quenched body, prior to aging treatment, is subjected to an isothermal treatment in a magnetic field, at a temperature of 580 to 650° C., preferably between 600 and 640° C., for a period of 10 minutes to 2 hours in a magnetic field of more than 2 oersteds.

Alloys of the present invention may be prepared by melting constituent metals or components together in a suitable furnace or crucible and then casting the melt. While such an ingot may, after machining to a suitable dimension, be subjected directly to the treatment procedures as set forth above, it is possible to divide the alloyed ingot into a powder and then to compact and sinter the particles to a coherent body of a desired geometry.

(3) DESCRIPTION OF THE DRAWING

The above and other objects, features and advantages of the present invention will become more readily apparent from the following description, reference being made to the accompanying drawing in which.

(4) SPECIFIC DESCRIPTION

Figure 1:
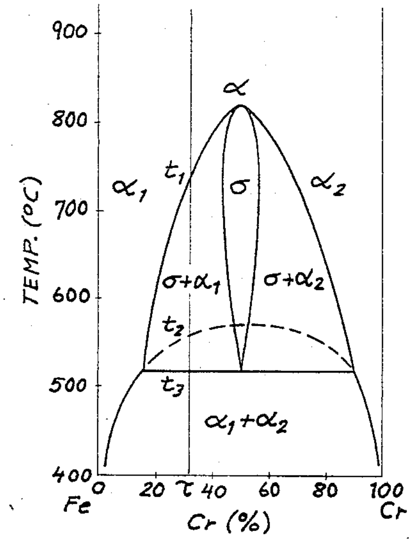
FIG. 1 is a phase diagram illustrative of the spinodal concept.

FIG. 1 depicts the phase diagram of iron-chromium alloy for explanation of the spinodal decomposition of the alloy which is exploited in this invention. It can be seen that, during the cooling process, with a composition *c*, the high temperature single phase: $\alpha$ phase which if of b.c.c. structure here, produces at a temperature $t_1$, $\sigma$ phase precipitated therefrom to form $\alpha$ plus $\sigma$ phase which in turn is decomposed at a temperature $t_2$ corresponding to the miscibility gap of the system at composition *c* into two isomorphous phases, an iron-rich $\alpha_1$ phase and chromium-rich $\alpha_2$ phase, initiating the spinodal reaction, which is completed at a temperature $t_3$. Since $\alpha_1$ phase is magnetic whereas $\alpha_2$ phase is nonmagnetic and because of the ultrafine size (about 0.03 micron diameter) and the desirably elongated shape of each of $\alpha_1$ phase precipitates which are uniformly dispersed surrounded by $\alpha_2$ phase precipitates, the resulting structure forms what can be called the single-domain structure.

(5) SPECIFIC EXAMPLES

Example I

Figure 2:
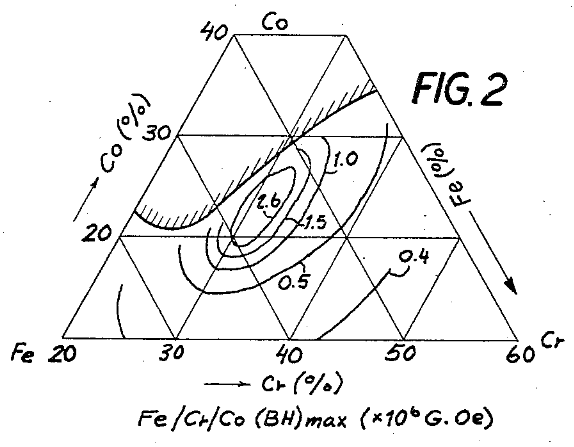
FIGS. 2, 3, 5, 6, 8 and 9 are composition diagrams.

Varying proportions of Fe/Cr/Co alloy were prepared by melting electrolytic iron, electrolytic chromium and commercially pure cobalt in an induction furnace and charging the melts into a quartz tube having a diameter of 0.5 cm. Each of the ingots was cut to a length of 3 cm., and was subjected to solution treatment which included heating at a temperature of 1350° C. and then quenching into oil. Each of the specimens was then aged or tempered at a temperature of 610° C. for 6 hours. The magnetic hysteresis loops of the resulting bodies were measured by an automatic flux recorder. FIG. 2 shows equi-value curves of the maximum energy product (BH) max. plotted upon a ternary composition diagram. It is seen that more than 0.5 M (million) gauss-oersteds of maximum energy product is obtained when chromium ranges between substantially 25 and 40%, and cobalt ranges between substantially 15 and 35%, the balance being iron. The region shaded in the composition diagram represents the region in which the alloy has $\gamma$ phase instead of $\alpha$ phase in the solution-treatment high-temperature range and thus the region which is inadequate to effect the spinodal decomposition. Accordingly, the definition of the composition range set forth for the present invention does, of course, exclude this region, some overlap notwithstanding. FIG. 2 also indicates that a better cobalt range exists between about 15 and 30% and a best result or the maximum energy product which reaches 2.6 Mgauss-oersted is obtained at a composition consisting of 45% iron, 30% chromium and 25% cobalt.

Example II

Figure 3:
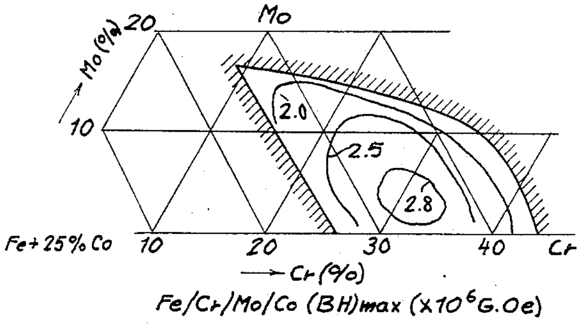

The effect of addition of molybdenum to the ternary Fe/Cr/Co alloy was investigated wherein, in view of the fact that an optimum composition of the ternary alloy lies in 25% cobalt as shown in Example I, this cobalt proportion is maintained with addition of various amounts of molybdenum. Specimens of these compositions were prepared and heat-treated in the manner essentially same to that in Example I and the maximum magnetic energy product (BH) curves of the resulting magnetic bodies are plotted in the quaternary diagram of FIG. 3. From the diagram it is seen that a relatively wide range of compositions which permits the maximum energy product to reach and/or exceed 2.5 Mg.-oe. exists. It has also been found that the best result or the maximum energy product which reaches 3.0 Mg.-oe. with a residual flux density of 8000 gauss and a coercive force of 750 oersted is obtained when the alloy contains 3% molybdenum, 25% cobalt, 31% chromium and the balance iron. In general, it has been established that addition of molybdenum in the range which satisfies the spinodal decomposition requirement and thus excludes the region generally shaded in the diagram, provides more or less satisfactory magnetic properties and that the best molybdenum proportion in the quaternary Fe/Cr/Co/Mo alloy ranges between 1 and 5%.

Example III

The effects upon the present magnetic material alloys of the isothermal magnetic treatment and the step tempering subsequent to the solution treatment were investigated using specimens having an optimum composition of 3% molybdenum, 25% cobalt, 31% chromium and the balance iron as set forth in the preceding example. The following table shows the residual flux density Br in the unit of gauss, the coercive force $H_c$ in the unit of oersted and the maximum energy product, (BH) max. in the unit of Mgauss-oersted of (1) a specimen which corresponds to the preceding example and which was subjected to a single-step tempering at a temperature of 610° C. for 6 hours without magnetic treatment, (2) a specimen tempered at a temperature of 640° C. in a magnetic field of 4000 oersted for 25 minutes, (3) the specimen (2) which was subsequently tempered at a temperature of 610° C. for 1 hour and (4) the specimen (3) which was further tempered at a temperature of 580° C. for a period of 2 hours, all the specimens being initially solution-treated commonly at a temperature of 1350° C. for a period of 30 minutes.

| | (1) | (2) | (3) | (4) |
|---|---|---|---|---|
| | Tempering 610° C., 6 hrs. | Mag. tempering 640° C., 25 min. | Tempering 610° C., 1 hr. | Tempering 580° C., 2 hrs. |
| Br (gauss) | 8,000 | 10,000 | 9,200 | 10,100 |
| $H_c$(oe.) | 750 | 370 | 850 | 810 |
| (BH) max. (Mg.-oe.) | 3.0 | 2.4 | 3.6 | 4.4 |

Figure 4:
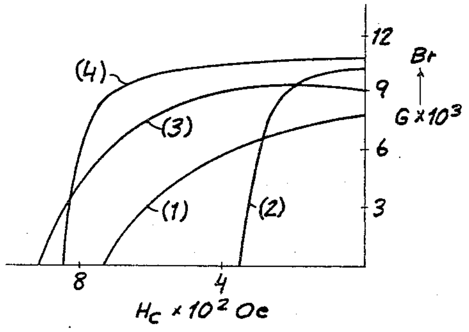
FIG. 4 is a demagnetization graph.

From the above, it is seen that the isothermal magnetic treatment and step tempering remarkably enhance the magnetic properties. FIG. 4 shows demagnetization curves measured of these specimens from which it is apparent that the tempering treatment in a magnetic field also noticeably improves the rectangularity of the hysteresis loop of the alloy.

Example IV

A specimen composed of 3% molybdenum, 25% cobalt, 31% chromium and the balance iron and solution-treated at 1350° C. for 30 minutes was tempered initially at 640° C. for 30 minutes in a magnetic field of 4000 oersteds, then at 600° C. for 2 hours and finally tempered at 580° C. for 2 hours. The treated body has a residual flux density of 10,600 gauss, a coercive force of 835 oersteds and a maximum energy product of 4.6 Mgauss-oersteds.

Example V

Figure 5:
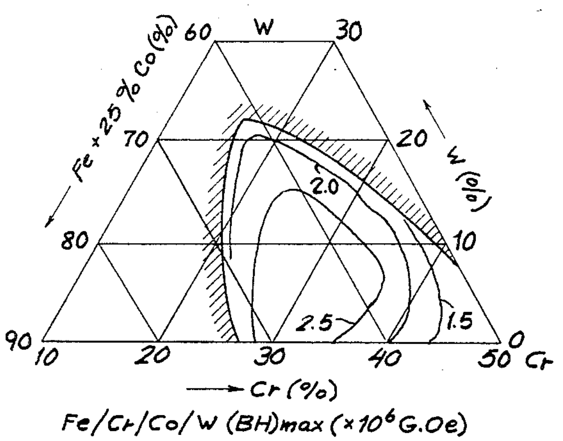

The effect of addition of tungsten to the ternary Fe/Cr/Co alloy was investigated using compositions of a fixed 25% amount of cobalt and varying amounts of tungsten, chromium and iron in view of the fact that an optimum ternary composition lies in this proportion of cobalt. Ingots were prepared by melting these constituent metals in varying proportions together in an induction furnace and introducing the melt into a quartz tube having a diameter of 4 mm. Each of the ingots was cut to a length of 30 mm. and used as a specimen. Each specimen was solution-treated at a temperature of 1350° C. for 1 hour and then aged or tempered at a temperature of 610° C. for 6 hours. FIG. 5 shows curves of maximum energy product measured of these specimens and plotted on the composition diagram of the quaternary Fe/Cr/25%Co/W alloy. In the diagram, the shaded area here again represents the region of composition which is incapable to effect the spinodal decomposition and which is to be excluded here. The plotted diagram indicates that the region in which excellent or satisfactory values of maximum energy product are attained expands significantly, that tungsten may be included up to 20% to maintain or even enhance the general magnetic performance of the ternary Fe/Cr/Co alloy, and that the better tungsten upper limit lies at 15%.

Example VI

A specimen containing 10% tungsten, 25% cobalt, 30% chromium and the balance iron prepared and solution-treated in the manner of the preceding example was tempered initially at a temperature of 630° C. for 30 minutes in a magnetic field of 4000 oersteds, then at a temperature of 610° C. for a period of 1 hour, and finally at a temperature of 580° C. for a period of 2 hours. The treated specimen had a maximum energy product of 5.0 Mg.-oe.

Further experimentation with varying proportions of the quaternary alloy has shown that the substantially same value of maximum energy product as set out above is obtained when cobalt ranges 20 to 27% chromium ranges 28 to 33%, tungsten ranges 5 to 15% and the balance iron, especially when the magnetic and step tempering treatments are employed.

Example VII

Figure 6:
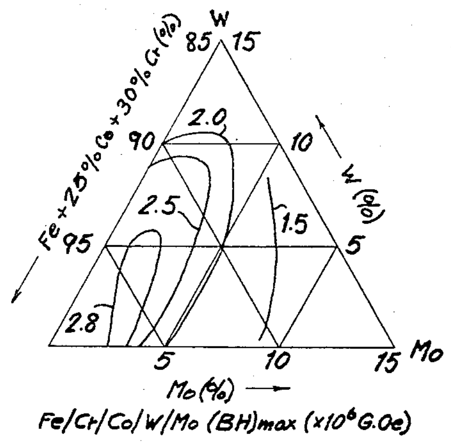

The effect of the addition of both tungsten and molybdenum to the ternary Fe/Cr/Co alloy was investigated. Specimens containing 25% cobalt, 30% chromium, 0 to 15% molybdenum, 0 to 15% tungsten and the balance iron were prepared and solution-treated at a temperature of 1330° C. for 1 hour and then tempered at a temperature of 610° C. for a period of 6 hours. FIG. 6 shows upon the five-composition triangular diagram curves of maximum energy product prepared by gathering the measured values of these specimens. From the plotted diagram, it is apparent that with the quinary alloy good values of the magnetic property are obtained with molybdenum and tungsten which substantially are proportioned in the individually optimum ranges. It is seen that for optimum results, molybdenum should range up to 5%, preferably up to 4% whereas tungsten should range up to 10%, preferably up to 7%.

Example VIII

A specimen composed of 25% cobalt, 30% chromium, 4% tungsten, 2.5% molybdenum and the balance iron and solution-treated in the manner of the preceding example was tempered initially at a temperature of 630° C. for a period of 30 minutes in a magnetic field of 4000 oersteds, then at a temperature of 610° C. for a period of 1 hour, and finally at a temperature of 580° C. for a period of 2 hours. The treated body had a maximum energy product of 5.6 Mg.-oe. The magnetic and step tempering treatment was applied to the varying proportions of the quinary alloy and it has been demonstrated that the essentially same value maximum energy product as set out above is obtained when the alloy contains 20 to 27% cobalt, 28 to 33% chromium, 3 to 6% tungsten, 2 to 3% molybdenum and the balance iron.

It should be noted that although tungsten and molybdenum are themselves nonmagnetic, the individual and combined addition of these components to the ternary Fe/Cr/Co alloy does not adversely affect, but rather can noticeably improve, the magnetic properties of the basic system. In addition, they individually or in combination make the alloy ductile, thereby enhancing the usefulness thereof. It has already been pointed out that they individually and in combination significantly expand the composition ranges in which good magnetic properties are obtained.

Example IX

Figure 7:
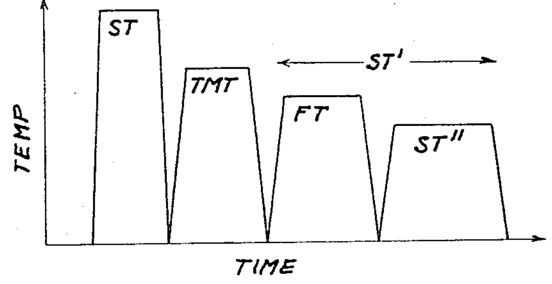
FIG. 7 is a graph illustrating heat-treatment steps according to the invention.

Specimens having varying proportions of the ternary Fe/Cr/Co alloy were prepared having a length of 30 mm. and a diameter of 4 mm. Each specimen was first solution-treated at a temperature of 1300° C. for a period of 1 hour and quenched to water mixed with ice blocks with the rate of cooling being about 200° C./sec. The solution-treated body was tempered or aged initially at a temperature of 630° C. for a period of 30 minutes in a magnetic field of 4000 oersteds, then at a temperature of 610° C. for a period of 1 hour and finally at a temperature of 580° C. for a period of 2 hours. The mode of these heat-treatment steps are shown in the diagram of FIG. 7 in which the abscissa represents time and the ordinate represents temperature.

Figure 8:
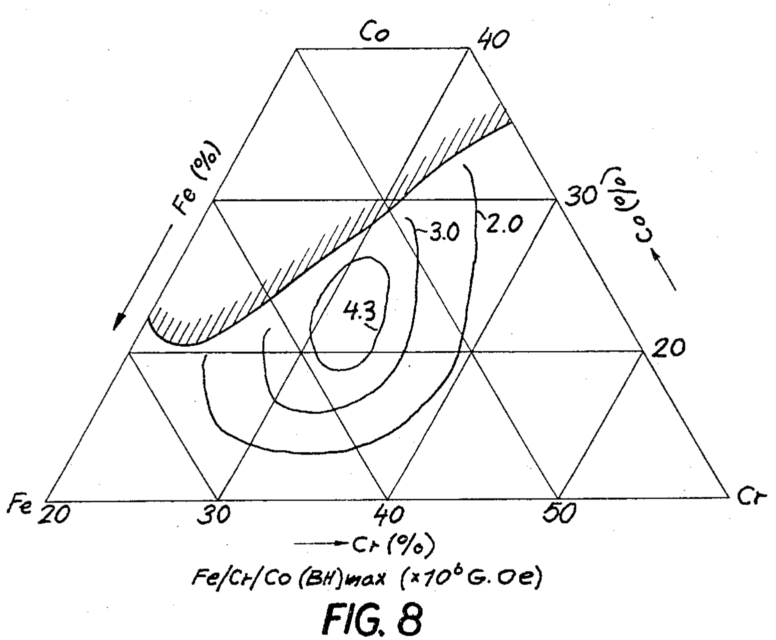

In the diagram:

ST=solution treatment
TMT=thermomagnetic treatment
ST′=step tempering
FT=first tempering
ST″=second tempering This mode corresponds exactly or substantially to modes set forth in those of the previous examples which use the magnetic and step tempering treatments. FIG. 8 shows the triangular composition diagram having curves of maximum energy product drawn upon collecting the measured values of these specimens. From the plotted diagram, it is apparent that when the alloy contains 20 to 25% cobalt, 29 to 33% chromium and the balance iron, the maximum energy product attainable reaches 4.3 Mg.-oe. or more, and that in general the alloy should contain 15 to 35%, preferably 17 to 30% cobalt; 25 to 40%, preferably 27 to 37% chromium; and the balance iron. The shaded area in the diagram represents the region of the composition with which the alloy has $\gamma$ phase (f.c.c. structure or face-centered-cubic) at the solution-treatment temperature from which phase the spinodal decomposition does not occur and is to be excluded here.

Example X

Figure 9:
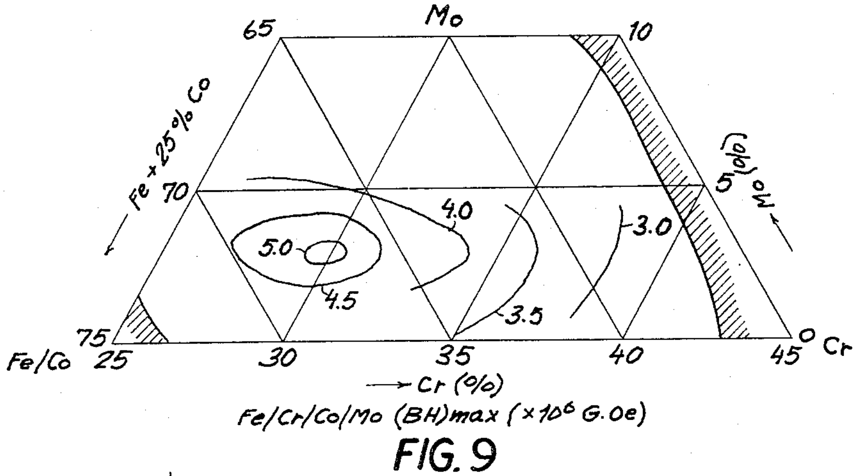

The diagram of FIG. 9 shows equi-valued maximum energy product curves of the quaternary Fe/Cr/Co/Mo system which were prepared based upon the values measured of specimens having varying proportions of the quaternary alloy with the amount of cobalt being fixed at 25% and which were prepared and treated in the same manner as in the preceding example. It should be noted that compositions which permit the maximum energy product to reach as high as 5.0 mg.-oe. exist including again the composition of 3% molybdenum, 25% cobalt, 30% chromium and the balance iron. In general, when the alloy contains 15 to 30% cobalt, 25 to 40% chromium, 1 to 5% molybdenum and the balance iron, resultant magnetic properties are excellent.

As has been pointed out a preferred heat-treatment procedure for preparing the improved or spinodal-decomposed alloy system of the present invention requires the solution treatment which includes the heating of the alloy in the specified temperature range and the subsequent quenching thereof which needs a rate of cooling as high as 200° C./sec. It has been found that such quenching conditions are advantageously moderated when the alloy contains silicon in a certain proportion, the resulting alloy having undiminished magnetic properties.

Example XI

Figure 10:
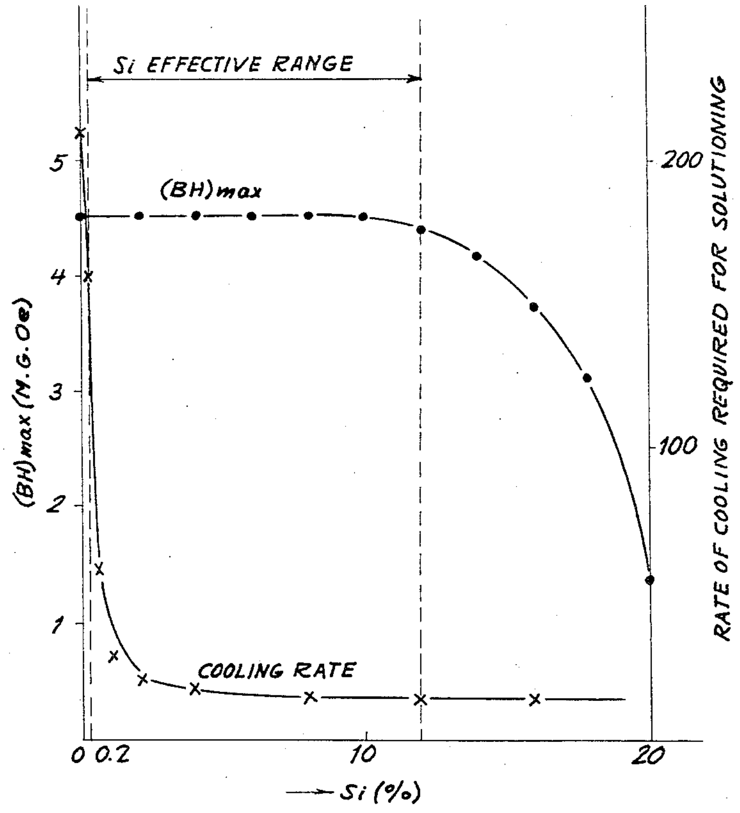
FIG. 10 is another graph illustrating magnetic properties.

Specimens containing varying amounts, in a range of 0 to 20%, of silicon and the balance consisting essentially of 23% cobalt, 30% chromium and 47% iron were prepared by casting and had a length of 30 mm. and a diameter of 4 mm. Each of the specimens was solution-treated and aged essentially in the same manner used as in the Example IX and, in the quenching step at the end of the solution treatment, measurement was made of the minimum rate of cooling of the heated specimen required to effect the solution treatment. Measurement was also made of the magnetic properties of the treated specimens. The result of the measurements is shown in the graph of FIG. 10 in which the abscissa represents the amount of silicon while the ordinate represents both the maximum energy product and the rate of cooling, the curves A and B showing, respectively, the maximum energy product and the rate of cooling required for solution treatment, with respect to the proportion of silicon. It is apparent from these curves that when silicon is added in amounts of 0.2%, 0.5%, 1% and 10%, the rate of cooling may correspondingly be dropped as low as 160° C., 60° C., 30° C. and 13° C./per second, without decreasing the resulting maximum energy product, and that 0.2 to 12% represents an optimum range of addition of silicon to the basic system.

We claim:

1. A magnetic composition consisting of 0.2% by weight to 12% by weight silicon and an alloy constituting the balance of said composition, said alloy consists of cobalt 15 to 35% by weight of the alloy, chromium in an amount of 25 to 40% by weight of the alloy, 0 to 20% by weight (of the alloy) molybdenum, 0 to 20% by weight (of the alloy) tungsten and the balance of the alloy being iron.

2. The composition defined in claim 1 wherein said alloy contains 15 to 30% by weight (of the alloy) cobalt.

3. The composition defined in claim 1 wherein said alloy contains 1 to 5% by weight (of the alloy) molybdenum.

4. The composition defined in claim 1 wherein said alloy contains 1 to 4% by weight (of the alloy) molybdenum and 2 to 7% by weight (of the alloy) tungsten.

5. The composition defined in claim 1 wherein said alloy contains 5 to 15% by weight (of the alloy) tungsten.

6. The magnetic composition defined in claim 1 wherein said silicon is present in an amount of at least 1% by weight.

7. A magnetic composition consisting of 1 to 12% by weight (of the total composition) silicon and the balance of the composition being an alloy, said alloy consisting essentially of 15 to 35% by weight (of the alloy) cobalt, 25 to 40% by weight (of the alloy) chromium, 1 to 5% by weight (of the alloy) molybdenum and 2 to 15% by weight (of the alloy) tungsten, the balance of the alloy being iron.

8. A spinodal decomposition-type alloy consisting essentially of 15 to 35% by weight cobalt, 25 to 40% by weight chromium, 0 to 20% by weight molybdenum, 0 to 20% by weight tungsten and the balance iron.

9. The alloy defined in claim 8 which contains 15 to 30% by weight cobalt.

10. The alloy defined in claim 8 which contains 1 to 5% by weight molybdenum.

11. The alloy defined in claim 8 which contains 5 to 15% by weight tungsten.

12. The alloy defined in claim 8 which contains 1 to 4% by weight molybdenum and 2 to 7% by weight tungsten.

References Cited

UNITED STATES PATENTS

| | | | |
|---|---|---|---|
| 3,588,764 | 6/1971 | Olsen et al. | 75—126 H |
| 2,553,609 | 5/1951 | Schmidt | 75—134 F |
| 2,111,005 | 3/1938 | Remmers | 148—31.57 X |
| 2,837,452 | 6/1958 | DeVos et al. | 75—134 FX |
| 3,689,254 | 9/1972 | Inoue et al. | 148—31.57 X |

GEORGE T. OZAKI, Primary Examiner

U.S. Cl. X.R.

75—126 H, 134 F; 148—31.55, 31.57

UNITED STATES PATENT AND TRADEMARK OFFICE

CERTIFICATE OF CORRECTION

PATENT NO. : 3,806,336

DATED : April 23, 1974

INVENTOR(S) : Hideo KANEKO and Kiyoshi INOUE

It is certified that error appears in the above-identified patent and that said Letters Patent are hereby corrected as shown below:

Column 1, between lines 6 and 7 insert:

-- Claims priority, application Japan,

December 28, 1970, 45/129,642;
June 30, 1971, 46/48,250 ;
August 25, 1971, 46/64,946 -- .

Signed and Sealed this

Twenty-first Day of December 1976

[SEAL]

*Attest:*

RUTH C. MASON
*Attesting Officer*

C. MARSHALL DANN
*Commissioner of Patents and Trademarks*